United States Patent [19]

Laakso

[11] 4,131,508

[45] Dec. 26, 1978

[54] RECOVERY SYSTEM FOR OXYGEN BLEACHING OF PULP

[75] Inventor: Oliver A. Laakso, Glens Falls, N.Y.

[73] Assignee: Kamyr Inc., Glen Falls, N.Y.

[21] Appl. No.: 339,760

[22] Filed: Mar. 12, 1973

[51] Int. Cl.² .................................................. D21C 11/04
[52] U.S. Cl. ................................... 162/30 K; 162/33; 162/65
[58] Field of Search ................ 162/30, 35, 45, 37, 162/38, 65, 33; 423/207

[56] References Cited

U.S. PATENT DOCUMENTS

| | | | |
|---|---|---|---|
| 1,742,218 | 1/1930 | Richter | 162/30 |
| 2,862,887 | 12/1958 | Boyer | 162/30 X |
| 3,210,235 | 10/1965 | Ferrigan, Jr. et al. | 162/30 |
| 3,258,391 | 6/1966 | Cornell et al. | 162/30 |
| 3,269,941 | 8/1966 | Compte et al. | 162/30 X |
| 3,347,739 | 10/1967 | Tomunson | 162/30 |
| 3,366,534 | 1/1968 | Rapson | 162/30 |
| 3,617,434 | 11/1971 | Nakafuri | 162/30 |
| 3,654,070 | 4/1972 | Pradt et al. | 162/30 |
| 3,830,688 | 8/1974 | Mannbro | 162/65 |

Primary Examiner—S. Leon Bashore
Assistant Examiner—William F. Smith
Attorney, Agent, or Firm—Cushman, Darby & Cushman

[57] ABSTRACT

A method is provided for recovery of white liquor and sodium hydroxide following the oxygen bleaching of pulp. A green liquor recovery system concentrates the spent black liquor, including spent liquor from the oxygen bleaching and spent black liquor, and then burns the spent liquor to form a smelt. This smelt is then dissolved in water to form the green liquor. The green liquor is divided into a first portion which is fed to a sodium hydroxide recovery system for recycling to the oxygen bleaching reactor and a second portion which is fed to a white liquor recovery system for recycling to the digester. A lime cycle is also provided to convert the resulting calcium carbonate (lime mud) to calcium oxide for recycling into the sodium hydroxide and white liquor recovery systems.

3 Claims, 2 Drawing Figures

RECOVERY SYSTEM FOR OXYGEN BLEACHING OF PULP

This invention relates to a recovery system for the effluent of the oxygen bleaching of cellulosic fiber materials, more particularly to the sodium hydroxide and white liquor recovery in a continuous cyclic recovery system for the digestion and oxygen bleaching of cellulosic fiber materials.

As evidenced by the *Encyclopedia of Chemical Technology*, Vol. 16, 1968, Kirk-Othmer, Page 708, cyclic recovery systems of white liquor after chlorine bleaching for recirculation to the digester are known. These systems generally comprise an evaporator, recovery furnace, green liquor clarifier slaker, causticizer, mud washer, lime kiln and white liquor clarifier. However, when an oxygen bleaching step is employed in place of the chlorine bleaching the material balance of the sodium hydroxide and chlorine for the bleaching step is upset since these components are normally produced by the electrolytic reduction of sodium chloride. Since chlorine is not required in oxygen bleaching, it is generally necessary to buy additional sodium hydroxide to complete the material balance.

It is the object of this invention to devise a recovery-purification system to avoid the need to purchase additional sodium hydroxide.

It is also the object to provide a recovery-purification system that adequately balances the cyclic recovery of sodium hydroxide for the oxygen bleaching of digested cellulosic fiber materials.

Other and further objects of this invention, together with an appreciation for the advantages thereof will become apparent in the following description.

Briefly, the recovery system involves circulation of the spent liquor, including spent liquor from the oxygen bleaching reactor and spent black liquor to an evaporator and then into the recovery furnace. The green liquor resulting after dilution of the furnace products with water is then clarified and divided into two portions. A first portion is crystallized and centrifuged to separate out the sodium carbonate crystals, which are then treated in the sodium hydroxide recovery system to form sodium hydroxide for recycling back to the oxygen bleaching reactor. A second portion is simultaneously treated to form the white liquor suitable for recycling to the digester. The calcium carbonate sludge is converted to calcium oxide to complete the lime cycle.

DETAILED DESCRIPTION

Figure 1:
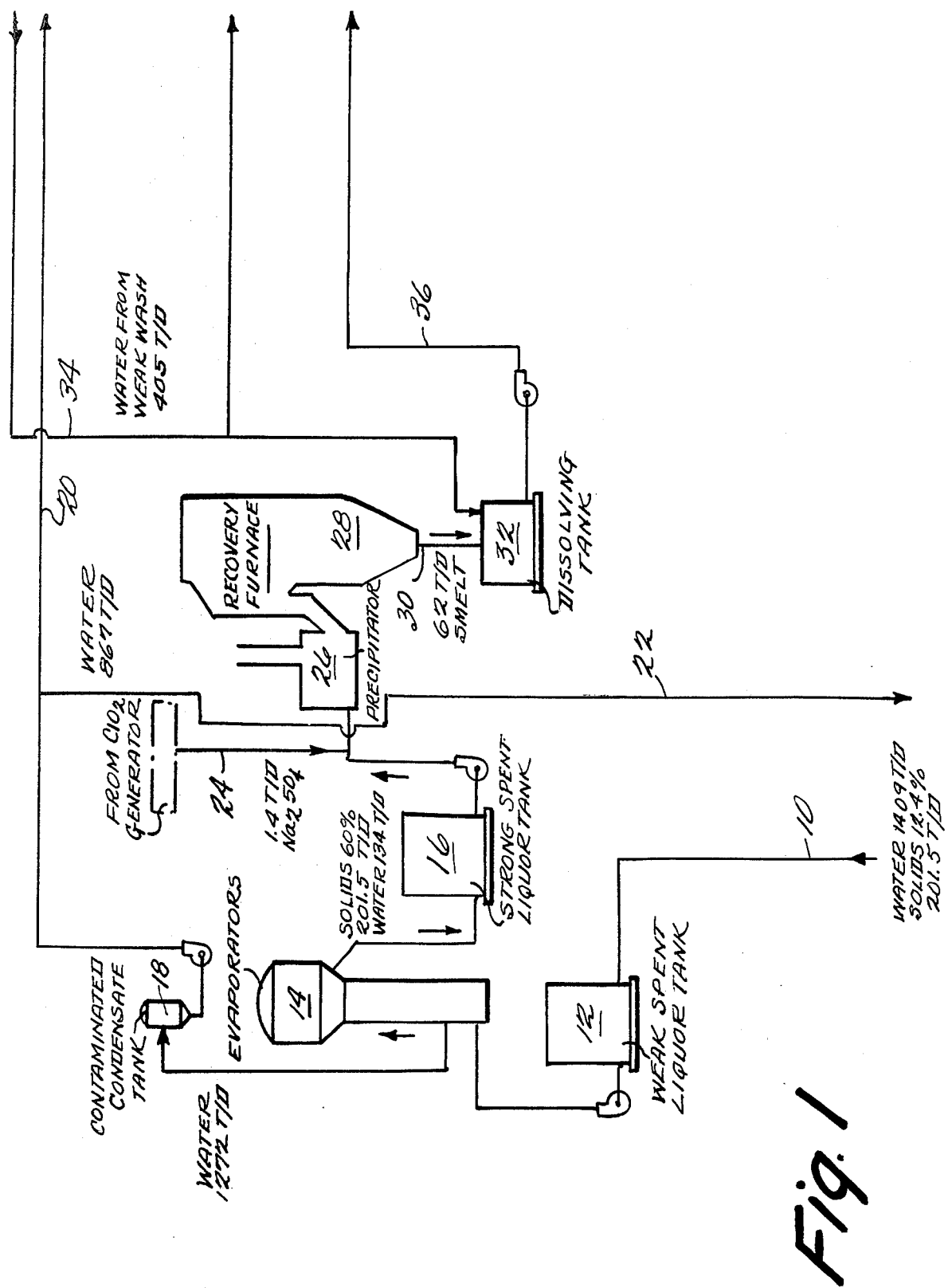
FIG. 1 illustrates diagrammatically the green liquor recovery system.
Figure 2:
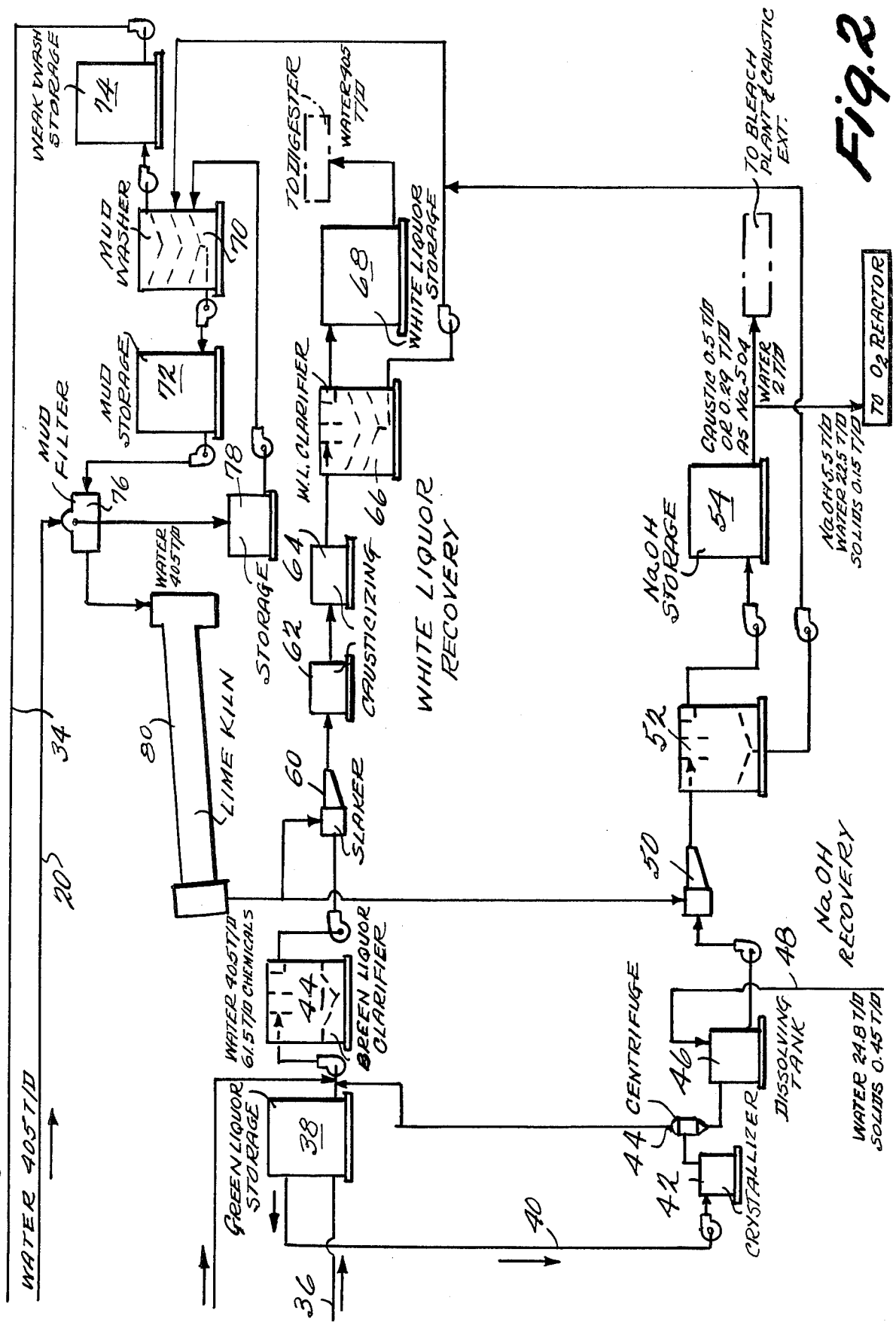
FIG. 2 illustrates diagrammatically the remaining recovery system comprising the white liquor and sodium hydroxide recovery systems.

For ease of understanding, the present recovery systems shown in FIGS. 1 and 2 are described on the basis of a plant producing 100 tons per day of bleached pulp. Other recited quantities and temperatures are determined by calculation based on standard data for the various solutions employed at indicated percent solids and boiling points. For convenience, specific material quantities and other conditions are given but it will be recognized that these can be widely varied provided the present inventive concepts are employed.

Referring first to FIG. 1, it will be noted that the spent liquor 10 is pumped from an oxygen bleaching reactor to the weak black liquor storage tank 12. From there it is pumped to the evaporator 14 to concentrate the liquor and then into storage tank 16. The water removed from the weak black liquor solution in the evaporator 14 is treated to remove contaminates in condensate tank 18 and then recycled. Preferably a portion of this water is sent via line 20 to the lime cycle shown in FIG. 2. Another portion of this water is sent via line 22 to a diffuser and brown stock storage tank following a digester (not shown). It will be recognized that the evaporator 14 may be of any suitable form generally used in the chemical industry and that more than one evaporator maybe employed.

From the storage tank 16 the concentrated black liquor is mixed with spent liquor 24 from a $ClO_2$ generator and fed into the precipitator 26. This mixture is then fed into recovery furnace 28 where the organic matter is burned off to recover the chemicals in the form of sodium carbonate and sodium sulfide. It is also possible to generate steam through utilization of the liberated heat. Reducing conditions are maintained at the base of the furnace so that smelt 30 contains sodium sulfide rather than sodium sulfate according to the following reaction:

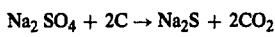

$$Na_2SO_4 + 2C \rightarrow Na_2S + 2CO_2$$

The ash (smelt) from the furnace 28 is then mixed in dissolving tank 32 with the water via line 34 from the weak wash in the lime cycle shown in FIG. 2. The liquor is generally agitated in order to dissipate the heat. The resulting solution is called green liquor because it carries an insoluble residue known as the dregs which gives it a dark green appearance. The dregs contain a small amount of carbon plus a number of inorganic constituents including iron sulfide, manganese dioxide, calcium carbonate, magnesium aluminum silicate, etc., which have their origin in the wood and process water or from corrosion of equipment.

The green liquor is fed via line 36 to a storage tank 38, as shown in FIG. 2. From here a first portion of the green liquor is pumped to crystallizer 42 which starts the beginning of the sodium hydroxide recovery system. The second remaining portion of the green liquor is pumped to clarifier 44 which starts the white liquor recovery system. The separated dregs from clarifier 44 may be mixed with water and used for washing the lime mud in the lime cycle.

In the sodium hydroxide recovery system, the green liquor is treated in the crystallizer 42 to form sodium carbonate crystals. The crystals are then separated in centrifuge 45 and dissolved in storage tank 46. The solution used to dissolve the crystals may be a portion of the spent liquor pumped via line 48 from the oxygen bleaching reactor (not shown). The sodium hydroxide is formed by slaking the sodium carbonate with calcium oxide in slaker 50, according to the following formula:

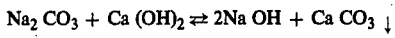

$$Na_2CO_3 + Ca(OH)_2 \rightleftharpoons 2NaOH + CaCO_3 \downarrow$$

The resulting sodium hydroxide solution is separated from the calcium carbonate by decantation in clarifier 52 and then fed into a storage tank 54 for recycling to the oxygen bleaching reactor and to an optional second caustic extraction in the bleaching plant. The calcium carbonate sludge, known as lime mud, is pumped via 56 to the lime cycle for conversion into calcium oxide.

The second remaining portion of the green liquor recovery is simultaneously slaked with calcium oxide in slaker 60. The causticizing reaction is allowed to proceed in agitating tanks 62 and 64. The resulting white liquor is separated from the calcium carbonate in clarifier 66. The calcium carbonate sludge is recirculated to the lime cycle for conversion to calcium oxide. The white liquor may be stored in tank 68 before recycling to the digester.

The calcium carbonate sludge is fed to a mud washer 70, with the resulting washed sludge being pumped to storage tank 72 and the wash water being recycled via tank 74 and line 34 to the dissolving tank 32, shown in FIG. 1. The lime mud is then filtered in the mud filter 76 with part of the water separated from the spent black liquor in evaporator 14, via line 20. The water from the filter 76 is then recirculated to the mud washer by storage tank 78. The lime from the filter is fed into lime kiln 80 to convert the calcium carbonate to calcium oxide to complete the lime cycle for the slakers 50 and 60.

The amount of green liquor fed to the white liquor and sodium hydroxide recovery systems depends on the desired amount of white liquor to be recycled to the digester and sodium hydroxide to be recycled to the oxygen bleaching reactor. For the material balance shown in FIGS. 1 and 2, purchase of additional sodium hydroxide is eliminated with a resulting savings of more than $3.50 per ton of pulp.

Various modifications other than those described herein may be employed without deviating from the invention as defined in the following claims.

I claim:

1. A method of digesting and then oxygen bleaching cellulosic fiber material in successive zones and subsequently regenerating white liquor for digesting and sufficient NaOH for oxygen bleaching so that no make-up source of NaOH for oxygen bleaching is necessary, said method comprising the steps of (a) feeding spent liquor, including spent liquor from the oxygen bleaching zone and spent black liquor, to a green liquor recovery system,
    (b) concentrating said spent liquor,
    (c) burning said spent liquor to produce a smelt,
    (d) dissolving said smelt to produce green liquor containing a solution of sodium carbonate, sodium sulfide, and dregs,
    (e) feeding a first portion of said green liquor to a white liquor recovery system and subsequently treating said green liquor to recover white liquor therefrom,
    (f) recycling said recovered white liquor to said digesting zone,
    (g) feeding a second portion of said green liquor to an NaOH recovery system, and subsequently (i) treating said green liquor in a crystalizer to form sodium carbonate crystals, (ii) separating said crystals in a centrifuge, (iii) dissolving said separated crystals in a tank to produce a sodium carbonate solution, (iv) slaking said sodium carbonate solution with calcium oxide in a slaker to produce a sufficient quantity of NaOH solution suitable for treatment of cellulosic fiber material in said oxygen bleaching zone so that essentially no additional NaOH solution from a make-up source is necessary to continuously effect oxygen bleaching, and (v) separating the resulting NaOH solution in an NaOH clarifier, and
    (h) recycling said NaOH solution to said oxygen bleaching zone.

2. A method as recited in claim 1 wherein said step (e) includes the steps of pumping said green liquor first portion into a clarifier, slaking said green liquor with a calcium oxide, reacting said green liquor in a causticizing tank to form white liquor, and separating said resulting white liquor clarifier.

3. A method as recited in claim 2 wherein calcium carbonate sludge from said white liquor clarifier and from said NaOH clarifier is fed to a lime recovery cycle wherein the sludge is washed, filtered, and converted to calcium oxide.

* * * * *